US010445113B2

United States Patent
Perry (10) Patent No.: US 10,445,113 B2
(45) Date of Patent: Oct. 15, 2019

(54) METHOD AND SYSTEM FOR SETTING THE USER INTERFACE TO SUIT THE DISPLAY SCREEN OF AN ELECTRONIC DEVICE

(75) Inventor: Ron Perry, Bnei Zion (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/406,542

(22) Filed: Feb. 28, 2012

(65) Prior Publication Data
US 2013/0061151 A1 Mar. 7, 2013

Related U.S. Application Data

(60) Provisional application No. 61/447,714, filed on Mar. 1, 2011.

(51) Int. Cl.
| | |
|---|---|
| *G06F 9/451* | (2018.01) |
| *G06F 3/0482* | (2013.01) |
| *G06F 3/0488* | (2013.01) |
| *G06F 3/0484* | (2013.01) |
| *G06F 16/24* | (2019.01) |
| *G06F 9/50* | (2006.01) |

(52) U.S. Cl.
CPC ............ *G06F 9/451* (2018.02); *G06F 3/0482* (2013.01); *G06F 3/0484* (2013.01); *G06F 3/0488* (2013.01); *G06F 9/5044* (2013.01); *G06F 16/24* (2019.01)

(58) Field of Classification Search
CPC .......... G06F 9/4443; G06F 8/38; G06F 1/163; G06F 3/011; G06F 9/451; G06F 9/5044
USPC ......................................... 715/744, 700, 733
See application file for complete search history.

(56) References Cited

U.S. PATENT DOCUMENTS

| | | | | |
|---|---|---|---|---|
| 7,155,681 | B2 * | 12/2006 | Mansour | G06F 9/452 715/762 |
| 8,131,875 | B1 * | 3/2012 | Chen | H04M 1/72522 707/E17.121 |
| 8,196,044 | B2 * | 6/2012 | Barrett | G06F 9/451 715/718 |
| 8,458,246 | B2 * | 6/2013 | Guney | H04L 67/303 707/695 |
| 8,745,228 | B2 * | 6/2014 | Beckert | H04L 67/2823 709/226 |
| 2002/0152244 | A1 * | 10/2002 | Dean | G06F 17/2247 715/255 |

(Continued)

*Primary Examiner* — Joy M Weber
(74) *Attorney, Agent, or Firm* — Jordan IP Law, LLC (57) ABSTRACT

The invention provides a method and system for setting the user interface to best suit the display screen of an electronic device, for instance, a cellular phone or a tablet. The method comprises a software application for installation upon an electronic device. The software has a plurality of user-interface variants. A remote server is maintained, having a repository mapping a list of a plurality of user interface variants best suited to a plurality of predetermined electronic devices. The software reports the identity of the electronic device to the server, and queries the server for the user-interface variant best suited for the specific device. When an answer is returned, the user interface is set accordingly. In some embodiments, a user can manually select a preferred user interface variant. His choice is reported to a preference analysis module which communicates with the server, for use in regard to future queries.

15 Claims, 5 Drawing Sheets

(56) References Cited

U.S. PATENT DOCUMENTS

| | | | |
|---|---|---|---|
| 2008/0140835 A1* | 6/2008 | Bradley et al. | 709/225 |
| 2009/0319672 A1* | 12/2009 | Reisman | 709/227 |
| 2010/0115434 A1* | 5/2010 | Yagi | G06F 8/38 |
| | | | 715/763 |
| 2010/0269047 A1* | 10/2010 | Pahlavan | G06F 9/4445 |
| | | | 715/740 |
| 2011/0199389 A1* | 8/2011 | Lu | G06F 3/017 |
| | | | 345/619 |

* cited by examiner

METHOD AND SYSTEM FOR SETTING THE USER INTERFACE TO SUIT THE DISPLAY SCREEN OF AN ELECTRONIC DEVICE

RELATED APPLICATION

This application claims priority under 35 U.S.C. § 119(e) to U.S. Provisional Application No. 61/447,714, filed Mar. 1, 2011, which is hereby incorporated by reference in its entirety.

FIELD OF THE INVENTION

The invention pertains to a method and system useful for electronic devices having a display screen and input mechanisms, such as cellular phones and tablet computers. The invention provides a solution to the problem of adapting displayed text or images and other user interface elements, to best suit the numerous sizes of display screens and types of input mechanisms associated with various devices which are prevalent today.

BACKGROUND

The recent boom in mobile computing has brought new challenges to software application developers. Many of the challenges stem from the wide variety of available devices, the need for a software application to be able to run on multiple types of devices, and the need for each application to provide a reasonable user experience regardless of the device on which it is running.

The difficulty in providing an optimal user experience on multiple devices stems from the different form-factors and user-interface paradigms that are present on different devices and operating systems. For example, users of a Smartphone expect a compact user interface (UI) that brings only the most important functions to the start screen, whereas users of a tablet device expect the layout of the mobile application's user interface to display a lot of information, which exploits the larger screen. As another example, users of a mobile device with a touch-screen expect pushbuttons rendered on the screen to be large enough to touch, while users of a device that has a pointer-based interface (e.g. a trackball) would expect active buttons to be smaller so as to make navigation between the buttons easier. As a further example, the graphic elements in a mobile application should usually match the screen size of the device. For example, this is a prominent issue with images that are used to render the background of a mobile application —especially if those images have rounded edges: if the background image is too small for the specific screen, a blank area will be left at the edges. If the image is too large, it will be cropped, and the rounded edges will not show. If the image is resized programmatically, the quality of gradients and other graphic elements will degrade. This is an issue across operating systems, but also within some specific operating systems, such as BlackBerry®. For instance, different BlackBerry® devices have different screen resolutions, and an application that was optimized to look good on a BlackBerry Bold® 9700 (which has a 480 ×320 screen resolution) will not necessarily look good on a BlackBerry Curve® 8520 (which has a 320 ×240 screen resolution).

A common approach to dealing with these usability issues is to design multiple versions of the user interface of the mobile application. Each version of the user interface is optimized to deal with a specific type of mobile device. For example, the Wall-Street-Journal® mobile application has a version for the small form-factor of the iPhone® smartphone, and a different version of the mobile application fur the larger form-factor of the iPad® tablet. For some mobile applications, the different user interfaces are coded to run within entirely different versions of the mobile application i.e., iPhone® users will download the iPhone® version of the mobile application, while iPad® users will download the iPad® version of the mobile application. In other cases, a single version of the mobile application identifies at runtime which device it is running on, and displays the appropriate user interface.

Creating multiple versions of the user interface is one way to provide users with an optimal experience for the device they are using. This goal is rather straightforward to achieve when there is a relatively small number of known form-factors for which the developer should optimize (for example, iPhone® Operating System applications, aka iOS® applications, should usually have two UI variants: one for the small form factor of iPhone and iPod®, and another for the large form factor of the iPad®).

However, the mobile landscape is extremely fragmented, and there are nowadays dozens of different vendors introducing hundreds and thousands of mobile device models, each one having somewhat different characteristics. As a result, developers that choose to target more than just iOS® devices are faced with additional complications. For example, the developer must choose how many different UI variants to create. Also, a mechanism must exist for choosing which UI variant to show in each device.

Choosing the UI variants is most often a business decision. Because each UI variant takes time and effort to create, it is usually up to the marketing department of an organization to decide how much optimization they require for each application: whether the optimization criteria include the size of the screen, or whether additional considerations are also included, such as whether the mobile device has a touch screen or a keyboard.

Once a decision regarding the number of UI variants is made, the mechanism for choosing which UI variant to show in a device becomes a usability issue: assuring that the most appropriate UI variant is used on each mobile device. This is not a simple issue to solve because the number of mobile device types available to the developer for testing during the development process is significantly smaller than the number of mobile device types available to the actual users. Moreover, new mobile devices are likely to be introduced to the market even after the development of the mobile application has been concluded.

Figure 1:
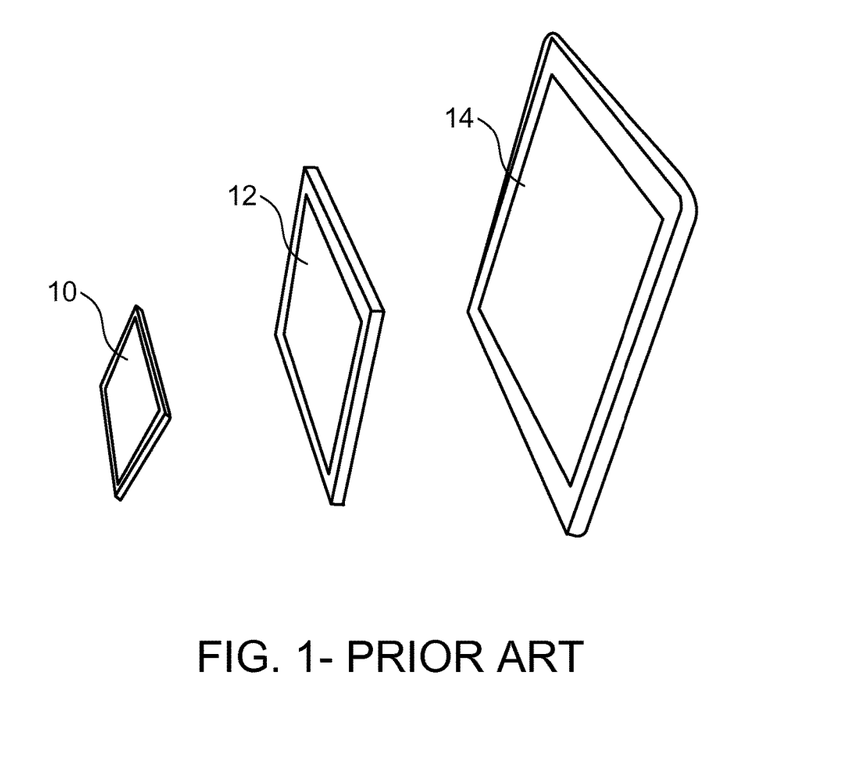
FIG. 1 demonstrates screen size differences of various common electronic devices, illustrating the need to select the appropriate user interface to best suit each device.

One approach to solving this problem that is often used in mobile web sites, is to have the web site query a general-purpose repository of technical information about mobile devices. One example is the WURFL® repository. This repository might contain details such as the size of the screen, or the availability of a touch interface. However, the result of choosing the appropriate VI-variant just by analyzing such details provides limited quality. FIG. 1 demonstrates such a problematic situation.

FIG. 1 demonstrates the difference in screen sizes for an Android® Smartphone 10, iPad® tablet 14, and a Galaxy Tab® 12. The screen size of the Galaxy Tab® 12 is somewhere in the middle between that of the iPad® 14 and that of the Smartphone® 10. If the developers of the mobile application created two user interface variants- one that relies on the large screen of a tablet 14, and one which is optimized for the smaller screen of smartphones 10 - it is not obviously clear which one would be appropriate for the Galaxy Tab® 12.

Accordingly, there is a need to adapt mobile user interfaces to multiple form-factors. An appropriate user interface for a given device needs to be selected for any given particular use.

SUMMARY

In the present invention, the term "mobile", in association with: "mobile device", "mobile application" and "application for mobile device", is used merely as an example of a typical electronic device which have various sized displays. These terms are not intended refer only to cellular phones or to applications for cellular phones, rather to electronic devices and applications for any electronic devices including a display. Such electronic devices include the following non-limiting examples: cellular phones, tablet computers, laptops, electronic handheld games, electronic handheld music players, and personal computers.

The present invention provides a method for setting the user interface to suit the form factor of an electronic device. The method comprises:
 a. providing a user with at least one software application having a plurality of user-interface variants;
 b. maintaining a repository upon a remote server, the repository mapping a list of a plurality of user interface variants best suited to a plurality of electronic devices;
 c. receiving a query from the software application, identifying an electronic device and requesting to select a suitable user interface variant from the repository for the electronic device;
 d. providing a response to the query, said response comprising an identified user variant suitable for the electronic device;
 e. utilizing said response to set the identified user interface variant for use in the electronic device.

In certain embodiments, a user is provided with the option to manually choose a preferred user interface from the plurality of user-interface variants. In such case, the preferred user interface variant manually chosen by the user, is reported to a preference analysis module which communicates with the remote server. During future queries, the preference analysis module is then queried, to find a user interface variant reported as preferred by most users.

Moreover, in the present invention, the electronic device may be selected from: a cellular phone, a tablet computer, a laptop computer, an electronic handheld game, an electronic handheld music player, and a personal computer.

Further, the query and the response may be communicated via one the following: the Internet; a message sent via a cellular phone provider; a local area network; a telephone system, a wireless network; a satellite network; and a cable TV network.

In some embodiments, the software application retrieves device information defining the electronic device hardware, from the operating system of the device.

In one embodiment, the software application is written in the native language of the electronic device.

Optionally, the software application may be executed within an interpreter that runs within a web browser on the electronic device.

The invention also provides a system for setting the user interface to suit the display screen of an electronic device, the system comprising:
 at least one software application having a plurality of user-interface variants, the application is configured for installation in the electronic device; and
 a remote server maintaining a repository, the repository mapping a list of a plurality of user interface variants best suited to a plurality of predetermined electronic devices.

The at least one software application is configured to query the repository to select a user interface from the plurality of user-interface variants; and the software application is configured to receive a response comprising the selected user variant, and to set the selected user interface for use upon the electronic device.

In the system, the at least one software application is configured to allow a user to choose a preferred user interface variant from the plurality of user-interface variants.

Optionally, the system may further comprise a preference analysis module, upon the remote server. The software application is configured to report the preferred user interface variant chosen by the user to the preference analysis module, and the repository is configured to receive updates from the preference analysis module.

Moreover, in the system, the electronic device may be selected from: a cellular phone, a tablet computer, a laptop computer, an electronic handheld game, an electronic handheld music player, and a personal computer.

In some embodiments of the system, the software application and the remote server communicate via one the following: the Internet; a message sent via a cellular phone provider; a local area network; a telephone system, a wireless network; a satellite network; and a cable TV network.

BRIEF DESCRIPTION OF THE DRAWINGS

The present invention is illustrated by way of example in the figures of the accompanying drawings, in which like references indicate similar elements and in which.

DETAILED DESCRIPTION

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In the following detailed description, reference is made to a mobile device, and providing a solution for adapting the displayed output of software applications for mobile devices; a mobile device is merely a common example of an electronic device which may have a wide variety of display screen sizes. The invention can be used with any type of electronic device having an associated display screen, to provide optimal displayed text and images for any software application, to best suit the display screen size and shape.

Some embodiments of the present invention provide methods and mechanisms which enable application developers to provide user interface (UI) selection options and allow choosing the most suitable UI variant for the users of their application on a specific mobile device during usage of the application without having to decide in advance which UI they should designate for which mobile device.

In general, the invention provides a method and system for setting user interfaces of mobile applications. The invention includes installing in a mobile device the software application of the invention, having a plurality of user-interface variants.

A repository maintained on a remote server, maps user interface variants to specific mobile devices.

When a user wishes to use a new application which he has downloaded, the software of the invention will be initiated to determine which user interface variant would be best suited to display the graphics and text of the application on the user's device. The software queries the repository that maintains mapping of user interface variants to specific mobile devices, to select a user interface from the plurality of user-interface variants, for the mobile device. When the user interface reply is returned, the software then sets the mobile application to use the selected user interface variant.

In one embodiment, the method further comprises allowing a user of the mobile device to manually choose a preferred user interface from the plurality of user-interface variants. Advantageously, the preferred user interface manually chosen by the user, may be reported to a preference analysis module, that may report to the repository, and aid in determining a user interface from the plurality of user-interface variants for the mobile device.

Figure 2:
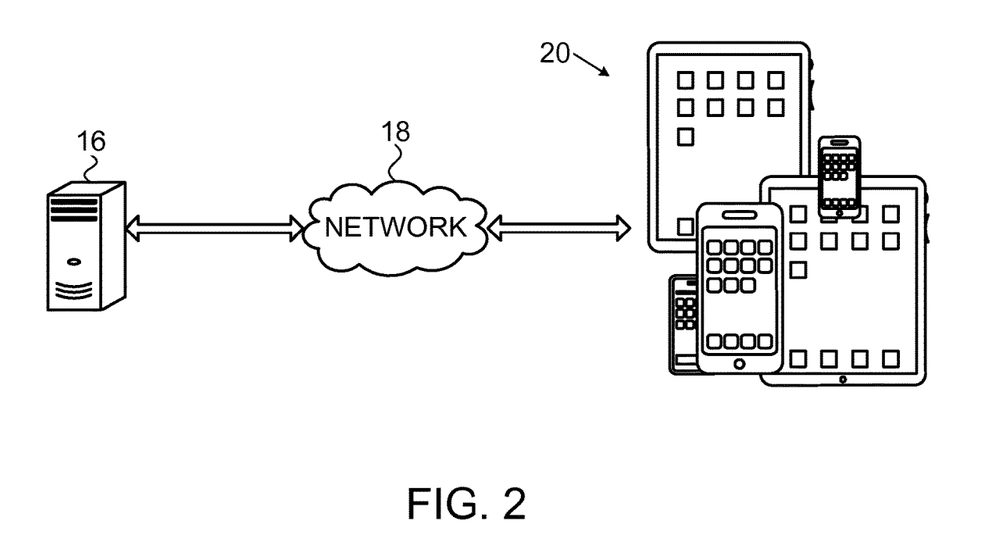
FIG. 2 illustrates an example of the invention embodied as a system including a server, a network and a plurality of mobile devices.

FIG. 2 illustrates an example of the invention embodied as a system including a server 16, a network 18, and a plurality of mobile devices 20. The server 16 maintains a preferences analysis engine (discussed below) and a mapping repository. The mobile devices 20 may access the server 16 via the network 18, which may include the Internet and/or a local area network (LAN). Optionally, any type of message may be sent via cellular phone provider.

The mapping-repository in the server 16 maintains mapping of specific mobile device models to preferred UI-variants best suited for each individual mobile device. The mapping-repository is queried over the network 18 by means of querying application of the invention, to select the default UI-variant for that specific mobile device model.

In one embodiment, the software application reports the UI-preference manually selected by a user of a specific mobile device model to a preferences analysis engine (discussed below). The preferences analysis engine analyzes cumulative data received from multiple mobile devices of the same type, and identifies the UI-variant that is preferred by most users for that type of mobile device. The preferences analysis engine stores the identified preferences for specific mobile device models in the mapping repository. The UI-variant that is identified as preferred by users of a specific mobile device model becomes the default UI-variant for other people using the same type of mobile device.

In any case, the application can allow users to switch between several preset UI-variants.

Figure 3:
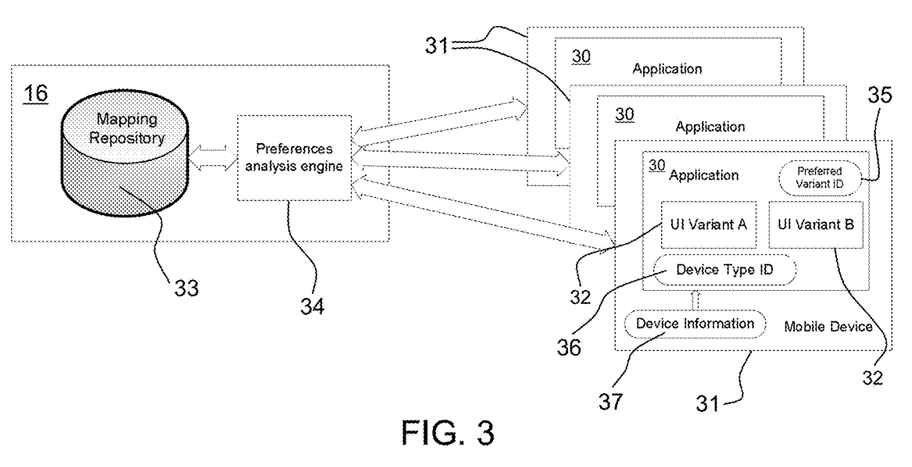
FIG. 3 illustrates schematically the flow of information between a mapping repository, a preferences analysis engine of a server, and multiple copies of the software application of the invention, installed upon various electronic devices.

FIG. 3 schematically illustrates the flow of information between a server and electronic devices belonging to several users. For clarity, the network is not shown.

The software application of the invention 30 is installed upon several electronic devices belonging to different users. Server 16 includes a mapping repository 33 and a preferences analysis engine 33.

Initially, a developer prepares a number of preset UI variants 32 for the software application of the invention 30 (also termed the "mobile application"). Each UI-variant 32 is tagged with a specific identifier (not shown). The mobile application 30 is designed to allow switching between UI-variants 32 at runtime.

A mapping repository 33 is created in a central location, such as at a server 16 that is accessible by the various mobile devices 31. This repository 33 maintains a mapping of specific mobile device models to preferred UI-variants for that mobile device. Repository 33 can initially be empty.

For each installation of a mobile application 30 of the invention on another mobile device 31, the mobile application 30 uses some means of storage (e.g., a "preferred variant ID" 35 variable that is stored on the mobile device's firmware or file system) to memorize which UI-variant should be selected by default when the mobile application 30 is launched on that specific mobile device 31. When the mobile application 30 is initially installed, this variable is assigned an "invalid" value.

For each installation of the mobile application 30 of the invention on another mobile device 31 (or, alternatively, every time the mobile application 30 is started on a user's mobile device 31), mobile application 30 retrieves device information 37 from the mobile device, said device information describing various attributes of the specific hardware of mobile device 31. Mobile application 30 then uses this information to derive a device type identifier 36. This derivation is performed by extracting selected hardware identifiers from device information 37. Device type identifier 36 should be a token that uniquely identifies mobile devices with shared usability attributes. Optionally, device information 37 is in the form of one or more identifiers that are provided by the manufacturer of the mobile device itself and preferably made available to the mobile application through an API call of the operating system of the mobile device. For example, the Android mobile OS provides the API constants "android.os.Build.MODEL", "android.os.Build.DEVICE" and "android.os.Build.DISPLAY". When queried on a specific type of mobile device, these constants may have the values "Nexus One", "passion" and "FRF50", respectively. A device type identifier 36 for that mobile device type could be created by concatenating the results returned for all of these three with intermediate separators, resulting in the value "Nexus One; passion; FRF50". Similar mechanisms exist on other mobile operating systems.

Each time the mobile application 30 is started on a user's mobile device 31, it checks whether the "preferred variant ID" 35 has been assigned a valid value. If not, the mapping-repository 33 is queried to find the preferred UI-variant 32 for that specific mobile device model, based on a device type identifier 36 that the mobile application 30 retrieves from the mobile device 31. This query may be performed directly from the mobile application 30 to the repository 33, or through an intermediate component, such as a preferences analysis engine 34, which may optionally apply some additional logic to the query.

If a valid value is returned by the query, this UI is used and its ID is stored as the "preferred variant ID" 35 for this user of the mobile device 31. If no entry is found, the user is given the option to choose a preferred variant manually.

In certain instances, a user may manually select a different UI variant. The mobile application of the invention, then forwards information about the user's new UI-variant preferences, along with device type identifier 36, to the preferences analysis engine 34, located in the remote server 16.

The preferences analysis engine 34 collects statistics about the preferences of users on different mobile device models, and identifies over time, for each mobile device model, a UI-variant that is preferred by the majority of users of that type of mobile device.

The preferences analysis engine 34 stores the identified preferences for specific mobile device models in the mapping repository 33 on the remote server 16, thereby making that information available to future queries by instances of the mobile application 30 of the invention, running on mobile devices 31. As a result, as explained above, the UI variant that is identified as preferred by most users of a specific mobile device model, will be used as the default UI variant 32 for other people using the same type of mobile device.

As numerous new electronic devices are constantly developed and marketed worldwide, one can envision that a large number of responses to user queries will be obtained from user variant preferences reported by users of new electronic devices.

Application with a number of Preset UI Variants

As a precursor to the whole process, the mobile application 30 of the invention may have more than one UI variant 32. Each UI variant 32 has its own characteristics, and specific code that implements it. There can be some code that is shared between the different variants 32, but each variant 32 typically looks differently on a specific mobile device and has a unique name or identifier.

The mobile application 30 should be able to dynamically switch between UI variants 32 after it has been started. In this example, it is also important that the user of the mobile application 30 be provided with a clear interface for selecting the current UI-variant.

Figure 4:
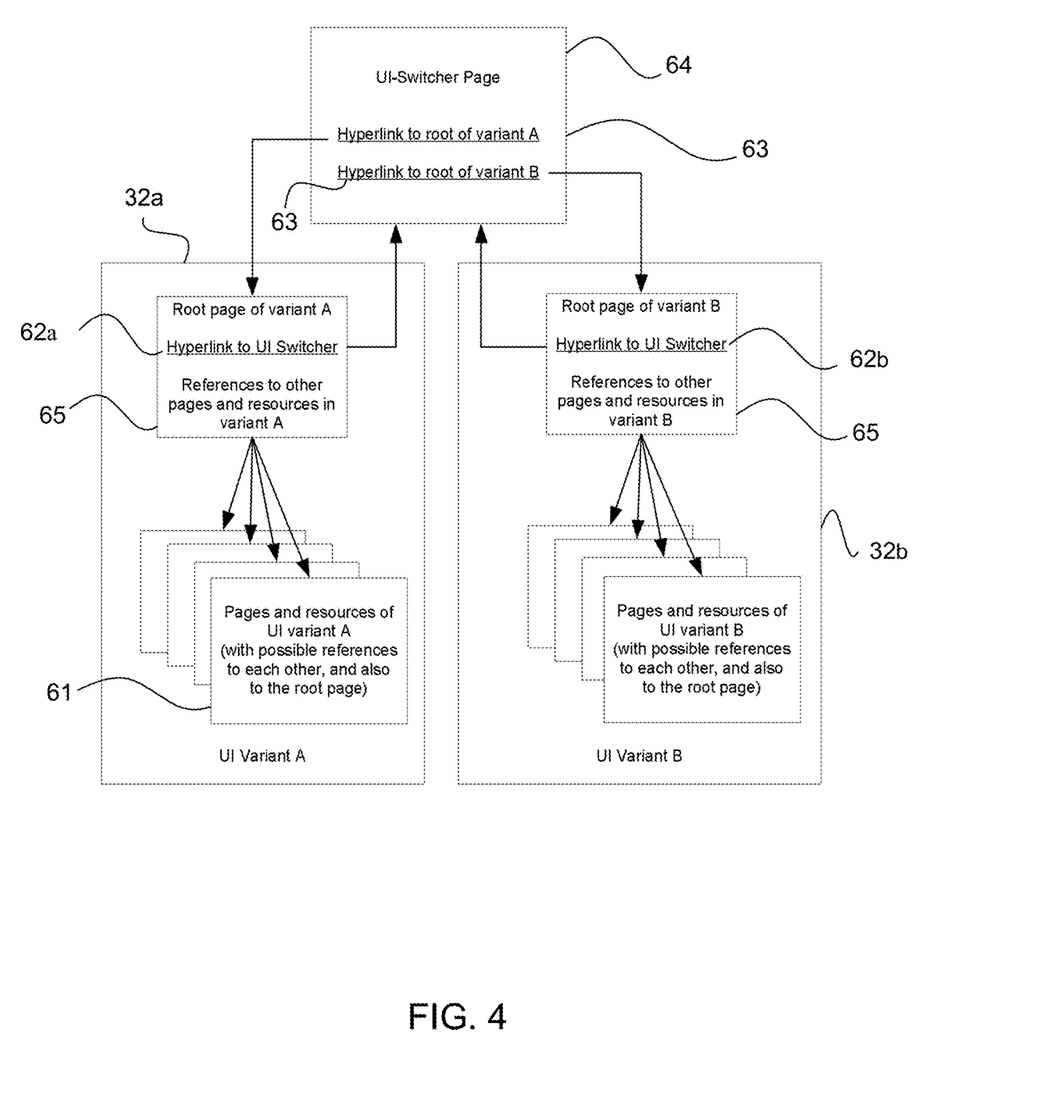
FIG. 4 illustrates how a user may switch between various user interface variants, using a Switcher page.

Referring to FIG. 4, one way of implementing such a mechanism, is by building most of the UI of the mobile application 30 in a "markup language", such as HTML, and placing the resources of each UI-variant 32a, 32b within a different directory in a memory of the mobile device. The pages 61 of a specific UI-variant would only reference resources that are part of that UI-variant, and not resources that belong to another variant. All UI-variants 32a, 32b would reference (and allow the user to access) a UI switcher-page 64, for example through a hyperlink 62a, 62b. UI switcher-page 64 contains links 63 to the root page 65 of each available UI-variant 32. By clicking a link in the switcher-page, the user can select a different UI-variant 32.

Maintaining Mapping Between Preferred UI Variants and Device Types

Advantageously, the mapping-repository 33 may be configured to maintain a per-application mapping between mobile device type identifiers 36 and preferred UI variants 32.

For example, the data model of the mapping-repository 33 may be described by the following tabular data structure:

| DEVICE_TO_UI_VARIANT_MAPPING_TABLE | |
|---|---|
| device_model_id | String(1024) |
| Preferred_ui_variant_id | Integer |

The value of device_model_id corresponds to the value of device type identifier 36 as was transmitted from the mobile device by the application 30.

Application Start-up

Figure 5:
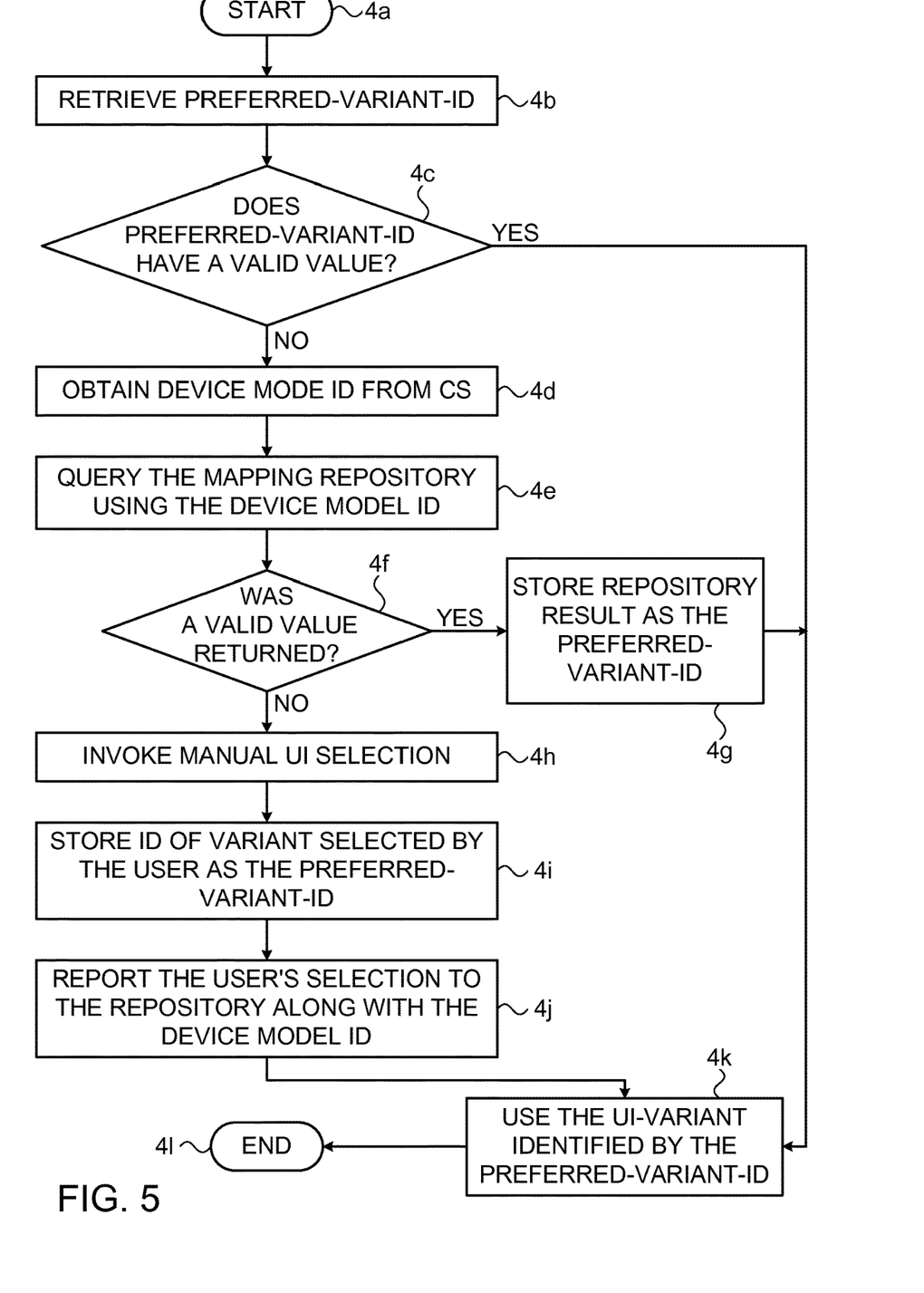
FIG. 5 is a flow chart illustrating the initial start-up process for the software application of the invention.

FIG. 5 is a flow chart illustrating a possible start-up process of a mobile application according to some embodiments of the present invention:

As the mobile application 30 is started (4a) it retrieves (4b) a preferred variant ID 35. The application 30 then checks (4c) if the value retrieved 35 indicates a valid UI variant 32.

If so, the application proceeds to use (4k) this variant 32 as the selected UI variant, and continues with regular processing (4l).

Otherwise, a device type identifier 36 is calculated (4d), and the mapping repository 33 is queried (4e) using device type identifier 36 as the key to the query.

The application then checks (41) whether a valid response was returned by that query.

If a valid response was returned (i.e., the response indicated the ID of a valid UI variant 32), this value is then stored (4g) as the preferred variant ID 35, and the application proceeds to use (4k) this variant 32 as the selected UI variant, and continues with regular processing (41).

Otherwise, the application invokes (4h) the manual UI selection process, which prompts the user of the mobile application 30 to try several of the UI variants 32 and choose a personally preferred one.

The ID of the UI variant chosen by the user is then stored (4i) as the preferred variant ID 35 for this mobile device 31, the ID of the chosen UI variant 32 is reported (4j) to the mapping repository 33 along with device type identifier 36, the chosen UI variant 32 is used (4k) as the selected UI variant, and the application proceeds (4l).

It is noted that the value of preferred-variant-ID 35 may persist between launches of the application 30. For example, it could be stored on the firmware of the mobile device 31. Another example would be to store it on a remote server using a unique identifier of the mobile device instance and a unique user ID.

Manual UI Selection Process

One purpose of the manual UI selection process is to allow the user to test one or more UI-variants in actual operation, and then decide which one is most suitable for the mobile device. Therefore, it is important to let the user actually experience the variants. One exemplary way of accomplishing this is as follows:

1. When starting this process, present a list of available UI-variants in a dialog, and prompt the user to try one of them.
2. When the user selects one of the UI-variants, hide the dialog, and apply the selected UI-variant for a few seconds.
3. After a few seconds, show another dialog, this time providing the user with several options, for example:
    a. Select this variant as the preferred UI variant.
    b. Continue using this variant for the current session, but do not yet choose it as the preferred variant.
    c. Try a different variant.

This dialog is shown automatically, as the selected UI variant may not display correctly on the mobile device, so without an automated query the user might not find an easy way to change the preferred UI.

4. If the user wishes to try another variant, restart the manual UI selection process (go to step 1).
5. If the user selects the current variant as the preferred variant: continue with the mobile application start-up process as described above.
6. If the user wishes to keep using the variant only for the current session, keep it as the current variant, but do not return a value to be stored in the "preferred variant ID", and do not report to the server. The next time the mobile application is launched, the manual UI selection process will be invoked again.

Figure 6:
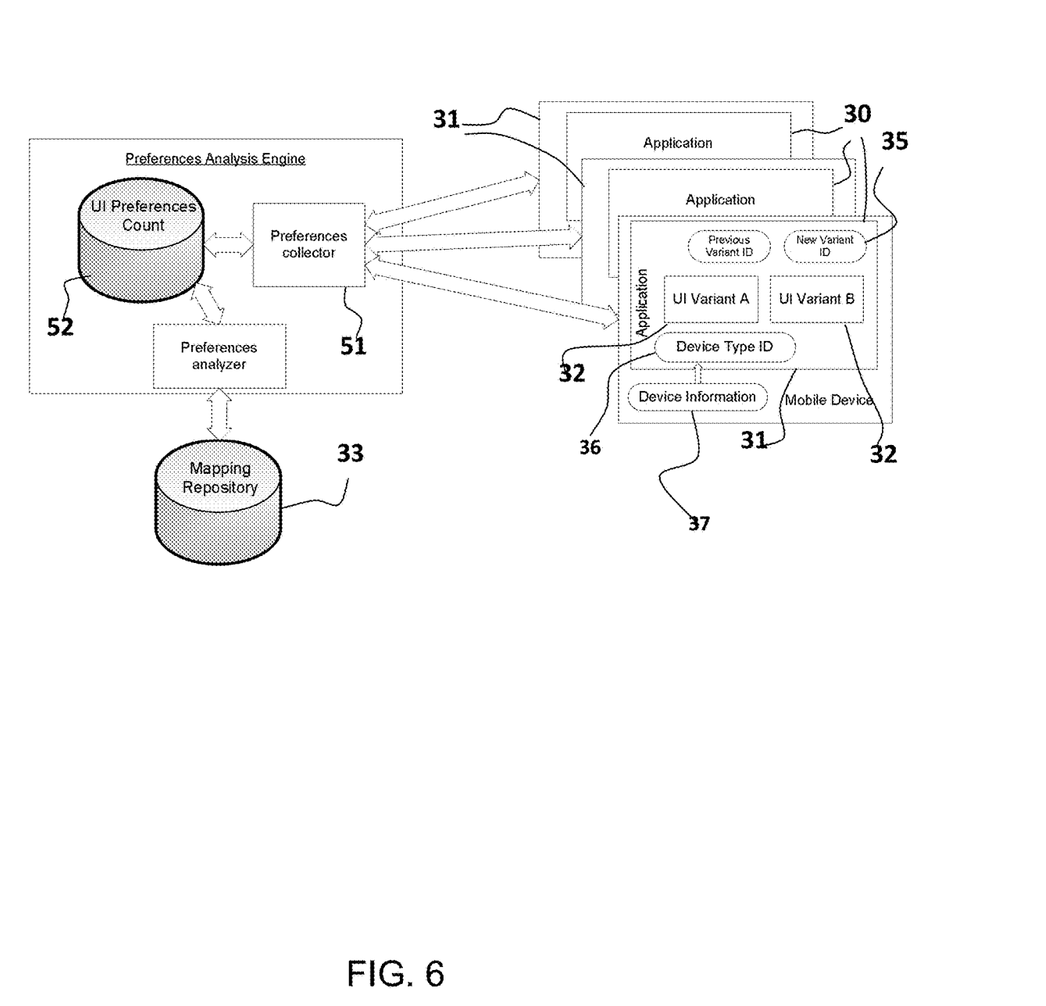
FIG. 6 illustrates collection of manually selected user interface preferences, by a sub-component termed the "preferences collector".

Reporting of UI Preferences by the Application and Collection by the Preferences-analysis-engine Referring now to FIG. 6, collection by the preferences-analysis-engine of UI preferences can be performed by a sub-component termed the "preferences collector", located upon the remote server.

For the first type of notification, the following message record may be used:

| | Notification: UI_VARIANT_SELECTED_BY_NEW_USER | |
|---|---|---|
| Field Name | Field Type | Comments |
| device_model_ID | String(1024) | Matches the token built from the data extracted from the OS |
| preferred_UI_variant_ID | Integer | The identifier of the UI variant selected |

When this type of notification is received by the preferences collector, it increments the user_count field of the record matching the device_model_id and preferred_ui_variant_ID in the UI Preference Counter.

A message record for the second type of notification could be:

| | Notification: UI_VARIANT_PREFERENCE_CHANGED_BY_EXISTING_USER | |
|---|---|---|
| Field Name | Field Type | Comments |
| device_model_ID | String(1024) | Matches the token built from the data extracted from the OS |
| previous_UI_variant_ID | Integer | The identifier of the UI variant previously reported to the preferences collector |
| new_UI_variant_ID | Integer | The identifier of the new UI variant selected |

The preferences collector 51 should generally be made accessible to all mobile devices 31. It is noted that, as mobile devices 31 may not have access to the network at all time, mobile devices 31 may store the data and report it to the preference collector when connectivity is restored.

A UI Preference Count data store 52 maintains information about the usage preferences. A possible structure of the relational table implementing this data store may be as follows:

| Field Name | Field Type | Comments |
|---|---|---|
| device_model_ID | String(1024) | Identical to the device_model_id sent from the app |
| UI_variant_ID | Integer | Matches the UI variant IDs available on the app |
| user_count | Integer | Indicates how many users of the app on the specific device model have chosen the specific UI variant |

This exemplary data store maintains an approximate count of the number of users of a specific mobile device model (as identified by a unique value of device type identifier 36) that prefer any specific UI variant.

This could be achieved by having the mobile application send two types of notifications: one type of notification when a UI-variant for a specific user is reported for the first time, and another type that is used when a user makes a change to the UI variant preference.

When this type of notification is received by the preferences collector 51, it would increment the user_count field of the record matching the device_model_ID and new_UI_variant_ID in the UI Preference Count 52, but decrement the user_count field of the record matching the device_model_ID and previous_UI_variant_ID.

In this fashion, the UI Preference Count data store 52 maintains the information required to perform the preferences analysis.

Analyzing the Reported Data to Select a Default UI Variant for a Specific Device Model The next step in the process may be analysis of the data stored in the UI Preferences Count table in order to identify a default preferred UI for each mobile device 31.

One straightforward way to achieve this is as follows:
For each device_model_ID:
  Select the UI_variant_ID with the highest user_count as the preferred UI_variant_ID for this device_model_ID
  Store the selected UI_variant_ID for this device_model_ID in the Mapping Repository 33.

This process can be repeated every time a new or altered UI preference is reported to the Preferences Collector 51.

The term "mobile device" may refer to any network-enabled portable computing device which has an operating system that can run applications, and that can communicate via a data network.

Applications can be written in the native language of the specific mobile device or operating system, or executed within an interpreter, for example, such as JavaScript interpreter that runs within a web browser on the mobile device.

The mapping-repository and the preferences-analysis-engine are not limited to residing on a single server, but can reside on any number of different machines.

The functionality of the subject matter of the present invention can be implemented in software, hardware, or a combination of software and hardware. For example, the hardware portion can be implemented using specialized logic; the software portion can be stored in a memory or recording medium and executed by a suitable instruction execution system such as a microprocessor.

The present invention is not limited to a specific network configuration. One or more networks or communication systems, such as the Internet, telephone systems, wireless networks, satellite networks, cable TV networks, and various other private and public networks, could be used in various combinations to provide the communication links desired or needed to create embodiments or implementations of the invention, as would be apparent to one of ordinary skill in the art. Thus, the invention is not limited to any specific network or combinations of networks.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable sub-combination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for setting a user interface to a display screen of an electronic device, comprising:
    mapping a list of a plurality of user-interface variants for one or more specific models of the electronic device, wherein the plurality of user-interface variants are related to various attributes of specific hardware of the electronic device including at least a form factor, a display screen size, and whether the display screen has touch input;
    receiving a query identifying the electronic device to request a user-interface variant from the list of plurality of user-interface variants, wherein the query includes various attributes of the specific hardware of the mobile device to derive a device type identifier, and the device type identifier is to be a token that uniquely identifies mobile devices with shared usability attributes;
    providing, in response to the query, a selected user-interface variant for the electronic device from the list of the plurality of user-interface variants based at least in part on the device type identifier;
    setting, in response to receiving the selected user-interface variant, the selected user-interface variant for use in the electronic device;
    manually selecting, in response to setting the selected user-interface variant, a preferred user-interface variant from the list of plurality of user-interface variants, wherein the preferred user-interface variant is to provide displayed text and images for any software application to the display screen; and
    reporting the preferred user-interface variant to a preference analysis module.

2. The method of claim 1, wherein providing, in response to the query, the selected user-interface variant, comprises querying the preference analysis module for a preferred user-interface variant selected by the preference analysis module as most suitable for the electronic device, wherein the query includes analyzing cumulative data received from multiple electronic devices of a same type.

3. The method of claim 2, wherein the preference analysis module selects the most suitable preferred user-interface variant for the electronic device by identifying the user-interface variant which is most preferred by users of a same model of the electronic device.

4. A method for setting a user interface to suit a display screen of an electronic device operable under at least one of a plurality of user-interface variants, the method comprising:
    maintaining a repository that maps a list of the plurality of user-interface variants for one or more specific models of the electronic device, wherein the plurality of user-interface variants are related to various attributes of specific hardware of the electronic device including at least a form factor, a display screen size, and whether the display screen has touch input;
    receiving, from the electronic device, a query identifying the electronic device and requesting a selection of a user-interface variant from the repository, wherein the query includes various attributes of the specific hardware of the mobile device to derive a device type identifier, and the device type identifier is to be a token that uniquely identifies mobile devices with shared usability attributes;
    responding to the query by providing a selected user-interface variant for the electronic device from the list of the plurality of user-interface variants based at least in part on the device type identifier;
    setting, in response to receiving the selected user-interface variant, the selected user-interface variant for use in the electronic device;
    manually selecting, in response to setting the selected user-interface variant, a preferred user-interface variant from the list of the plurality of user-interface variants, wherein the preferred user-interface variant is to provide displayed text and images for any software application to the display screen; and
    reporting the preferred user-interface variant to a preference analysis module.

5. The method of claim 4, wherein responding to the query comprises querying the preference analysis module for a preferred user-interface variant selected by the preference analysis module as most suitable for the electronic device, wherein the query includes analyzing cumulative data received from multiple electronic devices of a same type.

6. The method of claim 5, wherein the preference analysis module selects the most suitable preferred user-interface variant for the specific electronic device by identifying the user-interface variant which is most preferred by users of a same model of the electronic device.

7. The method of claim 4, wherein the user-interface variants reference a User Interface switcher page so as to allow a selection between user-interface variants.

8. The method of claim 4, wherein the electronic device is selected from: a cellular phone, a tablet computer, a laptop computer, an electronic handheld game, an electronic handheld music player, and a personal computer.

9. The method of claim 4, wherein the query and the response are communicated via one of: an Internet, a message sent via a cellular phone provider, a local area network, a telephone system, a wireless network, a satellite network, and a cable TV network.

10. The method of claim 4, wherein the identifying the electronic device comprises retrieving information concerning the electronic device which defines electronic device hardware from an operating system of the electronic device.

11. A system for setting a user interface to suit a display screen of an electronic device operable under at least one of a plurality of user-interface variants, the system comprising:
at least one software application configured for installation in the electronic device, the at least one software application having a list of user-interface variants that includes the plurality of user-interface variants; and
a remote server maintaining a repository that maps the list of the plurality of user-interface variants to one or more specific models of the electronic device, wherein the plurality of user-interface variants are related to various attributes of specific hardware of the electronic device including at least a form factor, a display screen size, and whether the display screen has touch input,
wherein the at least one software application is configured to:
query the repository to select a user-interface variant from the list of the plurality of user-interface variants, wherein the query includes various attributes of the specific hardware of the mobile device to derive a device type identifier, and the device type identifier is to be a token that uniquely identifies mobile devices with shared usability attributes;
receive a response comprising a selected user-interface variant for the electronic device from the list of the plurality of user-interface variants based at least in part on the device type identifier;
set, in response to receiving the selected user-interface variant, the selected user-interface variant for use by the electronic device;
manually select, in response to setting the selected user-interface variant, a preferred user-interface variant from the list of the plurality of user-interface variants, wherein the preferred user-interface variant is to provide displayed text and images for any software application to the display screen; and
report the preferred user-interface variant to a preference analysis module.

12. The system of claim 11, further comprising a preference analysis module in communication with the remote server and configured to receive, from the at least one software application, the manually selected preferred user-interface variant.

13. The system of claim 12, wherein the repository is configured to receive updates from the preference analysis module including analyzed cumulative data received from multiple electronic devices of a same type.

14. The system of claim 11, wherein the electronic device is selected from: a cellular phone, a tablet computer, a laptop computer, an electronic handheld game, an electronic handheld music player, and a personal computer.

15. The system of claim 11, wherein the at least one software application and the remote server communicate via one of: an Internet, a message sent via a cellular phone provider, a local area network, a telephone system, a wireless network, a satellite network, and a cable TV network.

* * * * *